United States Patent [19]

Gustafson et al.

[11] Patent Number: 4,641,970

[45] Date of Patent: Feb. 10, 1987

[54] RING LASER LOCK-IN CORRECTION APPARATUS

[75] Inventors: Harry A. Gustafson, Minneapolis, Minn.; Wah L. Lim, Anaheim, Calif.; Francis H. Zeman, New Brighton, Minn.

[73] Assignee: Honeywell Inc., Minneapolis, Minn.

[21] Appl. No.: 419,874

[22] Filed: Sep. 20, 1982

[51] Int. Cl.[4] ............................................. G01B 9/02
[52] U.S. Cl. .................................. 356/350; 372/29; 372/94
[58] Field of Search .................... 372/29, 94; 356/350

[56] References Cited

U.S. PATENT DOCUMENTS

| | | | |
|---|---|---|---|
| 4,152,071 | 5/1979 | Podgorski | 356/350 |
| 4,320,974 | 3/1982 | Ljung | 356/350 |
| 4,397,027 | 8/1983 | Zampiello et al. | 372/94 |
| 4,422,762 | 12/1983 | Hutchings et al. | 356/350 |
| 4,445,779 | 5/1984 | Johnson | 356/350 |
| 4,481,635 | 11/1984 | Broberg et al. | 356/350 |

*Primary Examiner*—Stephen C. Buczinski
*Attorney, Agent, or Firm*—Robert A. Pajak

[57] ABSTRACT

In the present application, an apparatus is provided for altering a ring laser angular rate sensor in such a way that the phase difference between the propagating waves therein includes lock-in error compensation. The apparatus of the present invention obtains a compensation output signal derived from the intensity of one or both of the propagating waves related to sensor lock-in error which can be utilized to alter the behavior of the ring laser so as to alter the behavior of the phase difference between the counter-propagating waves so that lock-in error contained therein is corrected.

22 Claims, 5 Drawing Figures

RING LASER LOCK-IN CORRECTION APPARATUS

Reference is hereby made to U.S. Pat. No. 3,373,650, entitled, "Laser Angular Rate Sensor," and U.S. Pat. No. 3,467,472, entitled, "Random Bias For Laser Angular Rate Sensor," both by J. E. Killpatrick, and U.S. Pat. No. 3,390,606, entitled, "Control Apparatus," by Podgorski, which is also assigned the same assignee as the present application. Reference is also hereby made to a publication, entitled, "Lock-In and Intensity-Phase Interaction in the Ring Laser," by Aronowitz and Collins, Journal of Applied Physics, Volume 41, No. 1, January 1970, and the publication entitled, "Positive Scale Factor Correction in the Laser Gyro," by Aronowitz and Lim, IEEE Journal of Quantum Electronics, Volume QE-13, No. 5, May 1977.

The present invention relates to the class of angular rate sensors wherein two waves propagate or travel in opposite directions along a closed-loop path. In particular, the present invention provides an apparatus for providing a compensation signal derived from the oppositely propagating waves for altering the behavior of the sensor so that the sensor output includes lock-in compensation.

In the class of ring laser angular rate sensors, two monochromatic waves are generated to propagate in opposite directions along an optical closed-loop path. The monochromatic waves are usually in the form of two laser beams. Rotation of the optical closed-loop path causes the effective path length traveled by the waves to change. Since the optical closed-loop path forms a resonant cavity providing sustained oscillations of the waves therein, the wave length of each of the waves will change, one increasing, the other decreasing as a result of rotation of the closed-loop path. Angular rotation of the closed-loop path, therefore, causes a frequency differential to occur between the two waves, which frequency differential is proportional to the rate of angular rotation.

One example of a ring laser angular rate sensor is shown and described in U.S. Pat. No. 3,390,606. The ring laser sensor shown includes a substantially thermally and mechanicaly stable block which forms a triangular shaped ring laser cavity defined by a mirror at each of the corners. The cavity is filled by a gas which comprises, for example, helium and neon gas. In accordance with prior art practice, one of the corner mirrors is somewhat transmissive for allowing a portion of each of the counter-traveling waves or beams to be extracted from the laser cavity so as to be heterodyned in a beam combiner to produce an interference pattern. The interference pattern is detected by a photodetector which senses the beat frequency of the heterodyned optical frequencies of the two beams which is a measure of the angular rotation rate. Furthermore, the output of the photodetector is a signal related to the phase difference between the counter-propagating waves.

A phenomenon commonly associated with ring laser angular rate sensors is known as "lock-in." Lock-in is the situation where the rate of rotation of the optical closed-loop path is below a critical value known as the lock-in rate below which the two waves oscillate at only one frequency. The lock-in phenomena is thought to be caused by coupling of energy between the waves, the dominant source being backscattering at the mirror surfaces. The contributors to the coupling of energy include, among others, aperture affects and the gas medium itself.

In order to obviate the effects of lock-in at the low rotation rates, the sensor may be biased in such a manner so that the device is kept out of lock-in for a majority of the time. One biasing scheme is shown in U.S. Pat. No. 3,373,650 which provides a means for varying the frequency difference so that the frequency difference varies in sign and a frequency difference exists for a majority of the time. This biasing technique is commonly known as dithering. Dithering may be provided by rotationally oscillating the sensor back and forth, and may also be provided by introducing an optical device in the path of counter-propagating waves so as to alter the frequencies of the waves. Another scheme for biasing a ring laser angular rate sensor is to rotate the sensor well above the lock-in rate. This technique too, has an optical counterpart whereby the frequencies of the waves are separated sufficiently so that a frequency difference exists in the presence of low rotation rates.

The above biasing techniques do not totally eliminate the effects of lock-in since there always exists some coupling of energy between the counter-propagating waves. Particularly, in a rotationally dithered ring laser angular rate sensor, the rate of rotation of the closed-loop path goes through zero at the extremities of each oscillation, i.e., the turnaround. About these turnaround points, the rate of change in phase difference between the waves goes through zero. At these turnaround points, an accumulation of lock-in error exists in a typical gyro output. The accumulation of lock-in error is known in the art as a random drift. In any dithered gyros, optically, mechanically, or the like, random drift exists since the rate of change in phase difference goes through zero where lock-in effects on the sensor output are known to be the greatest. It should also be noted that the sensor scale factor is also related to sensor lock-in rate in constant rate bias systems.

In ring laser angular rate sensors of the class described as aforesaid, a gas discharge current or ionization current must be made to flow through a portion of the optical closed-loop path so as to create a plasma which contains a population inversion of atoms—atoms in the elevated state. The presence of the plasma and the provision of the optical closed-loop path results in the counter-propagating laser beams within the resonant structure or cavity. There exists in the laser structure as just described a Langmuir flow effect which can alter the frequency of the counter-propagating waves. The Langmuir flow effect in a ring laser angular rate sensor results in what is referred to as a frequency difference bias or bias signal since a frequency difference results from the Langmuir flow effect and presents itself as a false rotation output signal. As is well known, the ring laser structure of the ring laser angular rate sensor is usually provided with two current discharge paths through the gas medium arranged in a balance mode. The balanced arrangement of the discharge currents obviate, for the most part, the Langmuir flow effect problem. Nevertheless, there exists a net bias in the output of the sensor system due to the difference between the discharge currents. In practice, the bias can be tolerated as long as the bias is stable. Bias stability is obtained in ring laser angular rate sensors (i) by use of discharge current control circuits for substantially driving the net difference in currents to be zero; and (ii) by symmetrical placement of the discharge current path through the optical closed-loop path.

SUMMARY OF THE INVENTION

In the present application, an apparatus is provided for altering the ring laser sensor in such a way that the phase difference between the propagating waves includes lock-in error compensation. The apparatus of the present invention derives a compensation output signal derived from the intensity of one or both of the propagating waves related to sensor lock-in error which can be utilized to alter the behavior of the ring laser so as to alter the behavior of the phase difference between the counter-propagating waves so that lock-in error contained therein is corrected.

DETAILED DESCRIPTION OF THE INVENTION

Before proceeding with a detailed explanation of the invention, it is helpful in the understanding of this invention to present some principles of behavior of a ring laser angular rate sensor which are substantially described in the above referred to publications. Equation (1) below, sets forth the well-known lock-in equation.

$$\dot{\psi} = \Omega_{IN} + \Omega_L \sin(\psi + \alpha) \qquad (1)$$

Equation (1) indicates that the rate of change in the phase difference between the propagating waves will change at a rate proportional to the inertial rotation of the closed-loop path plus a lock-in error term which vacillates in relation to the sine function of the phase difference between the propagating waves scaled by the quantity known as the lock-in rate, $\Omega_L$. Another way of stating the same, the rate of change of the phase difference between the propagating waves will vacillate at the beat frequency—frequency difference between the waves—since the value of the phase difference between the waves changes at a rate proportional to the frequency difference between the counter-propagating waves. The lock-in error of equation (1) as just described is herein referred to as phase rate error.

Figure 1:
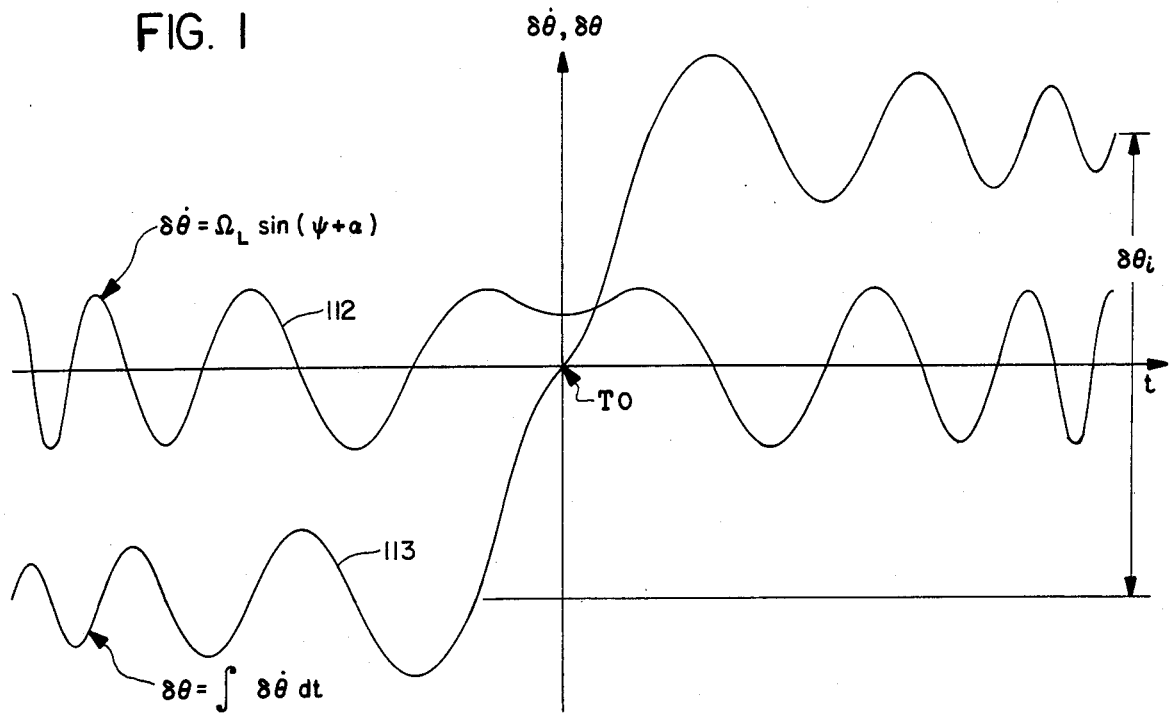
FIG. 1 is a graphical representation of the phase difference between the sensor waves illustrating lock-in error.

FIG. 1 graphically illustrates the lock-in error term or phase rate error of equation (1) for a mechanically oscillated sensor in the region of rotation direction reversal corresponding to a zero rate condition of $\Omega_{IN}$. Curve 112 plots the error term, the righthand term of equation (1) versus time, showing a decreasing frequency before the reversal occurring at time T0, and an increasing frequency thereafter. The essentially constant amplitude of curve 112 is dependent upon the sensor's characteristic lock-in rate or scale factor of the error term, $\Omega_L$. Curve 113 plots the error in the gyro angular output which is obtained by integrating curve 112. As shown, the angular error is oscillating with varying frequency and amplitude before and after the change of direction, and exhibits a step through an incremental error angle across the change of direction. This incremental error angle is herein referred to as the incremental lock-in error value and is the primary contributor to what is known as random drift in dithered gyros in which each of the incremental lock-in error values at each turnaround accumulates in the sensor output. As may be seen from FIG. 1, the error resulting from equation (1) is always present, but has its most important effects when a change of direction occurs. For a periodic sinusoidally dithered ring laser sensor, such a change of direction occurs twice each dither cycle, and such an error as described by curve 113 occurs at each change in direction. Unfortunately, these lock-in error values resulting from the alternating bias are not necessarily equal in magnitude nor always opposite in sign. This generally leads to a buildup of error in the gyro output sometimes referred to as random drift or random walk.

The discussion presented just above is described for a mechanically dithered gyro. Nevertheless, the characteristics of a sensor optically or electrically dithered are similar to those already presented, and therefore will not be discussed in the following discussion. Further, the analysis just presented is also applicable to other forms of dithering (say, triangular) besides sinusoidal dither. Further, the variation in the phase rate due to lock-in is present in constant rate biased sensor systems since in the presence of any rotation rate (bias or input), the phase angle is constantly changing, and the error term of equation (1) vacillates at the beat frequency.

Figure 2:
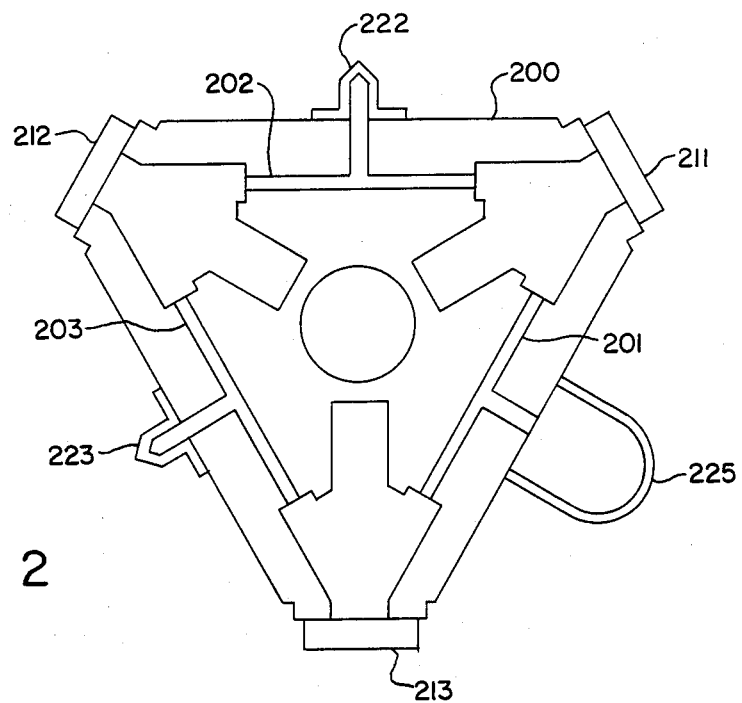
FIG. 2 shows a diagrammatic representation of a ring laser angular rate sensor structure.

Shown in FIG. 2 is a simplified representation of a ring laser angular rate sensor structure for producing counter-propagating waves which travel in substantially the shape of a triangle. The laser angular rate sensor of FIG. 1 comprises mechanically and thermally stable block 200, such as quartz, including a plurality of interconnected cavities 201, 202, and 203, so as to form an optical closed-loop path. Block 200 is in the shape of a triangle in which the vertices thereof are provided with wave reflecting surfaces such as mirrors 211, 212, and 213. A first anode 222 is shown to be in communication with tunnel 202, a second anode 223 is shown in communication with tunnel 203, and a cathode 225 is shown in communication with tunnel 201.

The structure so far described provides a laser oscillator within the triangular cavity of block 200 well known in the art. When sufficient voltage is applied between anode 222 and cathode 225, an ionization current will flow therebetween creating a plasma in a portion of tunnel 202 between anode 222 and mirror 211 continuous with a portion of tunnel 201 between mirror 211 and cathode 225. In these circumstances, counter-propagating laser beams can be generated within block 200. However, because of the Langmuir flow effect, an effective phase rate bias can result. A phase rate bias is discerned by usual laser gyro output schemes as a rotation or rotation bias. This is so since the output scheme usually monitors the phase rate which is derived from an interference pattern produced by heterodyning a portion of each of the waves. To obviate the Langmuir flow effect, a second cathode-anode path between anode 223 and cathode 225 is provided for balancing. When a voltage is applied between anode 223 and cathode 225, an ionization current is established between anode 223 and cathode 225 creating a plasma in a portion of tunnel 203 between anode 223 and mirror 213 continuous with a portion of tunnel 201 between mirror 213 and cathode 225.

If the two anode cathode paths and corresponding ionization current and plasma generation are symmetrical and of equivalent energies the phase rate bias caused by the Langmuir flow effect is minimized. If the differential ionization current, i.e., the current difference between the ionization or discharge currents corresponding to the two different paths, is minimized, the bias stability of the laser angular rate sensor is optimized. It should be observed, that the Langmuir flow effect is applicable to sensors other than the triangular shape shown in FIG. 2. For example, in a rectangular shaped angular rate sensor, it is equally important to provide equal and opposite ionization currrents and creation of plasma therefrom so as to minimize the impact of the Langmuir flow effects.

In the present invention, the Langmuir flow effect is utilized advantageously to compensate for the phase rate error. Equation (1) may be modified to explicitly include the phase rate bias caused by the differences in the discharge currents as shown in equation (2).

$$\dot{\psi} = \Omega_{IN} + K(i_1 - i_2) + \Omega_L \sin(\psi + \alpha) \tag{2}$$

Equation (2) describes the rate of change in the phase difference between the counter-propagating waves being a function of the input rate plus the phase rate error term plus the phase rate bias caused by a difference in discharge currents.

As discussed in the above referred to publications, the intensity of one of the beams, $I_1$ is altered by the coupling of energy of the second beam $I_2$ into the first beam, and the second beam $I_2$ is altered by the coupling of energy of the first beam $I_1$ into the second. Thus equation (2) may be rewritten to explicitly show the phase rate error term in terms of energy coupling coefficients $r_1$ and $r_2$ and arbitrary scattering angles $\epsilon_1$ and $\epsilon_2$ as shown in equation (3).

$$\dot{\psi} = \Omega_{IN} + K(i_1 - i_2) + r_2\sqrt{\frac{I_2}{I_1}}\sin(\psi + \epsilon_2) + r_1\sqrt{\frac{I_1}{I_2}}\sin(\psi + \epsilon_1) \tag{3}$$

In the present application, it is recognized that the latter two terms of equation (3) or the latter term of equation (2) is somewhat observable by monitoring the intensity of each of the waves. From the analysis set forth in the Aronowitz and Collins publication, one may set forth:

$$\frac{\dot{I}_1}{I_1} \alpha\, r_2\sqrt{\frac{I_2}{I_1}}\cos(\psi + \epsilon_2) \tag{4A}$$

$$\frac{\dot{I}_2}{I_2} \alpha\, r_1\sqrt{\frac{I_1}{I_2}}\cos(\psi - \epsilon_1) \tag{4B}$$

One may define compensation signals $C_1$ and $C_2$:

$$C_1 = \frac{\dot{I}_1}{I_1}\left(+\frac{\pi}{2}\right) = \delta_1 r_2\sqrt{\frac{I_2}{I_1}}\sin(\psi + \epsilon_2) \tag{5A}$$

$$C_2 = \frac{\dot{I}_2}{I_2}\left(+\frac{\pi}{2}\right) = \delta_2 r_1\sqrt{\frac{I_1}{I_2}}\sin(\psi - \epsilon_1) \tag{5B}$$

where $\delta_1$ and $\delta_2$ are system gain constants.

By inspection of equation (2), compensation signals $C_1$ and $C_2$ are $\dot{I}_1/I_1$ and $\dot{I}_2/I_2$ phase shifted by $\pi/2$ and are directly related to the phase rate error terms. Therefore, the phase rate error terms in the sensor output $\dot{\psi}$ may be compensated by appropriately introducing a phase rate bias term being a function of the compensation signals $C_1$ and $C_2$. The phase rate bias term may be introduced by altering the sensor in some physical manner with a phase rate biasing means.

One technique for introducing a phase rate bias term as a function of one or both compensation signals is via the sensor discharge currents which provides an inherent sensor bias capability. Signals $C_1$ and $C_2$ may be presented to a transducing means for providing modulation discharge currents $\Delta i_1$ and $\Delta i_2$ proportional to $C_1$ and $C_2$ respectively. Thus, the sensor discharge currents may be defined as:

$$i_1 = i_{10} - \Delta i_1 \tag{6A}$$

$$i_2 = i_{20} + \Delta i_2 \tag{6B}$$

where $$\Delta i_1 = \delta_1' r_2\sqrt{\frac{I_2}{I_1}}\sin(\psi + \epsilon_2) = G_1 C_1 \tag{7A}$$

$$\Delta i_2 = \delta_2' r_1\sqrt{\frac{I_1}{I_2}}\sin(\psi - \epsilon_1) = G_2 C_2 \tag{7B}$$

$$\left.\begin{array}{l} i_{10} = \text{constant} \\ i_{20} = \text{constant} \end{array}\right\} \text{primary sensor discharge currents} \quad \begin{array}{l}(8A)\\(8B)\end{array}$$

substituting equation (6A) and (6B) in equation (3) yields $$\dot{\psi} = \Omega_{IN} + K(i_{10} - i_{20}) + (1 - K\delta_1')r_2\sqrt{\frac{I_2}{I_1}}\sin(\psi + \epsilon_2) + (1 - K\delta_2')r_1\sqrt{\frac{I_1}{I_2}}\sin(\psi - \epsilon_1) \tag{9}$$

As $K\delta_1'$ and $K\delta_2'$ approach "1", equation (9) becomes the lock-in error compensated output:

$$\dot{\psi} = \Omega_{IN} + K(i_{10} - i_{20}) \tag{10}$$

Equation (10) thus is an expression for the first derivative of the phase difference between the counter-propagating waves which is equal to a function of the input rotation rate plus a phase rate bias term due to the difference in average discharge currents utilized for laser beam generation. The latter term is simply a bias term in the output. The lock-in terms or phase rate error terms of equation (2) are thus negated by compensation through bias introduced by modulation of the discharge currents.

It is important to note that resulting equation (10) is achieved by introducing a phase rate bias of magnitude directly related to the existing phase rate error. It is important to note that the lock-in error in itself has not been reduced, but rather, the phase rate error has been compensated by the introduction of a phase rate bias in the system proportional to the lock-in error observable in the beam intensities thus allowing the achievement of equation (10) in which the lock-in error is compensated.

Figure 3:
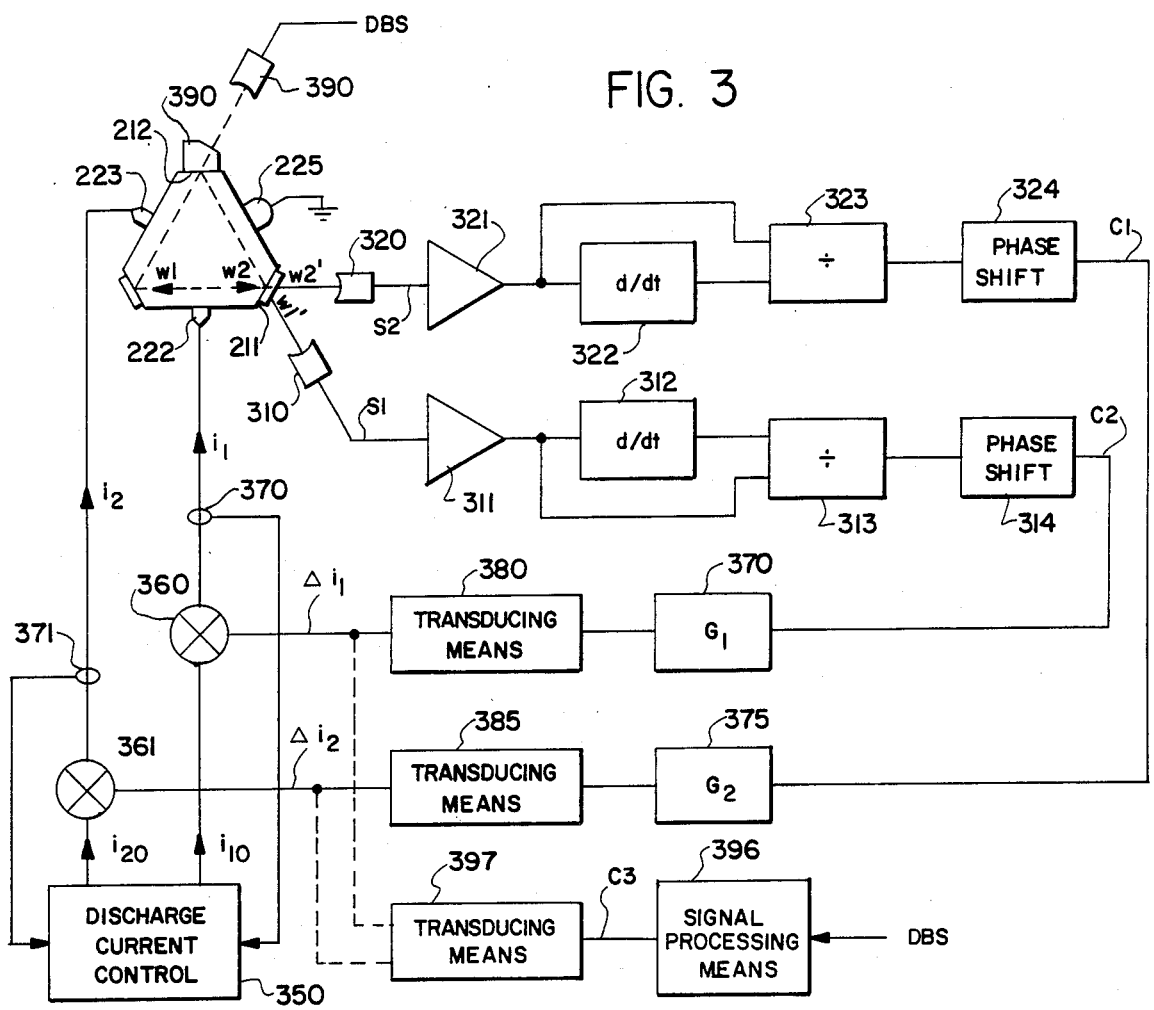
FIG. 3 is a block diagram showing an embodiment of the invention.

Shown in FIG. 3 is one embodiment of the invention in which the phase rate bias introduced by the discharge currents is advantageously employed to compensate for the phase rate error by directing the behavior of the phase rate, the first derivative of the phase difference between the counter-propagating waves. Referring now to FIG. 2 and FIG. 3, one of the wave reflecting surfaces, for example, 211 is made to be partially transmissive so as to provide an output beam proportional of each of the counter-propagating waves, as indicated in FIG. 3 as waves W1' and W2'. W1' and W2' are detected by photodetectors 310 and 320 for obtaining a signal indicative of waves W1' and W2'. Detector 310 produces an output signal S1 which is subsequently amplified by amplifier 311 and differentiated by differentiator 312. The output of differentiator 312 is divided by the output of amplifier 311 by divider 313 forming a divider output signal related to $\dot{I}_1/I_1$. The divider output signal is subsequently passed through a phase shifter of $\pi/2$ radians by phase shifter 314 having an output signal $C_1$. Similarly, the output of photodetector 320 provides a signal S2 indicative of wave W2'. The output signal S2 is passed through an amplifier 321 and differentiator 322. The output of differentiator 322 is divided by the output of amplifier 321 by divider 313 forming a divider output signal related to $\dot{I}_2/I_2$. The divider output signal is subsequently phase shifted by $\pi/2$ radians by phase shifter 324 having an output signal $C_2$. Each of the combinations of amplifier 311, differentiator 312, divider 313, and phase shifter 314 may be formed by a variety of electronic circuits, and may also be provided by a single high gain operational amplifier capable of providing the intended functions in combination. The above is also applicable for circuit blocks 321, 322, 323, and 324.

Signal $C_1$ is passed through a gain block 370 having gain (attenuation) $G_1$ and presented to a transducing means 380. Similarly, signal $C_2$ is passed through a gain block $G_2$ and presented to a transducing means 385. Transducing means 380 and 385 convert signals presented thereto to modulation currents to be added to the sensor primary discharge currents $i_{10}$ and $i_{20}$ respectively. The combination of gain block 370 and transducing means 380 is such that a modulation current is generated in accordance with equation (7A) and in which the gain $G_1$ is such that $K\delta_1'$ approaches "1". Similarly, the combination of gain block 375 and transducing means 385 is such that a modulation current is generated in accordance with equation (7B) and in which the gain $G_2$ is such that $K\delta_2'$ also approaches "1".

The two anodes, 222 and 223 and cathode 225 of the laster structure are also figuratively illustrated in FIG. 3. A discharge current control circuit 350 provides primary discharge currents $i_{10}$ and $i_{20}$ and which are presented to anodes 222 and 223 respectively through signal adding circuits 360 and 361 respectively. Adding circuit 360 sums modulation current $\Delta i_1$ and primary discharge current $i_{10}$ to provide current $i_1$, and adding circuit 365 sums modululation current $\Delta i_2$ and primary discharge current $i_{20}$ to provide current $i_2$. Each of the current $i_1$ and $i_2$ are monitored by current sensing means 370 and 371 to provide feedback to the current control circuit 350. The intended function of current control circuit 350 is to maintain the difference between the average of currents $i_1$ and $i_2$ to be nearly zero so as to minimize the bias phase rate produced by the current difference of $i_{10}$ and $i_{20}$ which causes the Langmuir flow effect. Generally, discharge current control 350 does not have a very fast time response so that the modulation currents are allowed to pass through so as to provide the intended phase-rate bias proportional to the lock-in error, i.e. phase rate error.

The operation of the embodiment of the invention shown in FIG. 3 will now be described. The output signals of photodetectors 310 and 320 represent the intensity variations of the intensity of each of the counter-propagating waves, the intensity variation being caused by the coupling of energy between the waves due to scattering and the like. The output of gain blocks 370 and 375 each provide a compensation output signal proportional to the phase rate error in the sensor caused by lock-in. Thus, the output of gain blocks 370 and 375 are directly proportional to the phase rate error terms of equation (3) which usually produce random drift in the sensor output. The compensation output signals are presented to transducing means 380 and 385 to produce modulation currents to subsequently modulate the sensor discharge currents so as to provide a phase rate bias. With proper scaling and sign, provided by phase shifters 314 and 324 and gain blocks 370 and 375, the phase rate bias introduced by the modulation currents is substantially equal in magnitude, but opposite in sign, of the phase rate error so as to compensate for the inherent sensor phase rate error due to lock-in. In the diagram of FIG. 3 the discharge currents are modulated as a function of the values of the compensation output signals $C_1$ and $C_2$ by the modulation currents. The modulation currents are added to the primary discharge currents produced by the current control circuit for establishing ionization current or discharge current in the laser angular rate sensor. It should be noted that only one of the discharge currents need be modulated in proportion to one of the phasor sum of signals $C_1$ and $C_2$ to provide the intended function. However, in such a situation, an unbalanced discharge current could result in creating an unwanted phase rate bias.

It should be noted that gain blocks 370 and 375 are primarily shown to illustrate the principles of the invention. The intended function of gain blocks 370 and 375 and also phase shifter 314 and 324 may be incorporated, for example into transducing means 380 and 385 respectively or amplifiers 311 and 321, or any other circuit block component shown in FIG. 3. Furthermore, transducing means 380 and 385 may be incorporated in discharge current control 350. Thus there is a wide range of circuit combination possiblities to provide the intended phase rate bias compensation signals so that the phase rate bias produced has a magnitude and sign which is substantially equal in magnitude, but opposite in sign, of the phase rate error.

The embodiment shown in FIG. 3 has utilized the discharge currents as a phase rate biasing means for introducing phase rate bias to compensate for phase rate error due to lock-in. It is, of course, possible to provide phase rate bias through other methods. One such method is the use of a Faraday cell in the optical path of the waves or the like, wherein the phase between the waves can be altered in proportion to the compensation output signals. Another example of a phase rate biasing means is a means for producing mechanical rotation such as an additional mechanical modulation component with mechanical dithering. In either of these approaches, the scaling factors $G_1$ and $G_2$ must be appropriately chosen to provide the intended compensation so that phase rate error is compensated.

Figure 4:
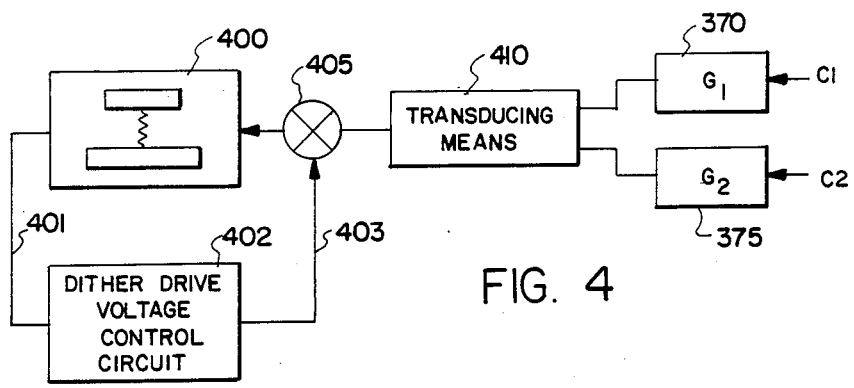
FIG. 4 is a block diagram showing another embodiment of the invention.

Shown in FIG. 4 is a simplified block diagram in which mechanical dithering is utilized for introducing a phase rate bias signal so as to provide phase rate error compensation. In FIG. 4, block 400 represents a spring-mass system comprised of a laser angular rate sensor which is coupled to a base through a spring means. Such a system is well known in the art and has a very high-Q. A sensing means (not shown) is provided to sense mechanical rotation of the spring-mass system 400 so as to provide a signal 401 which is presented to a dither drive voltage control circuit 402. The output of the dither drive voltage control circuit 403 is presented through an adding circuit 405 to a driving means (not shown) for mechanically oscillating spring-mass system 400. The closed-loop control circuit indicated in FIG. 3 by blocks 400, 402, and 405, is well known in the art. The sensing means is usually a piezoelectric device which is responsive to the motion of the spring-mass system, and the output of the dither drive voltage control circuit is presented to another piezoelectric device for inducing mechanical motion of the spring-mass system.

Also shown in FIG. 4 is transducing means 410 responsive to the output signals of gain blocks 370 and 375 which have similar output signals as those shown in FIG. 3. Transducing means 410 is capable of providing a single modulation drive voltage which can be added to the drive voltage signal 403. The output of transducing means 410 is presented to adding circuit means 405 which sums the output of transducing means 410 and dither drive voltage 403 of control circuit 402 for subsequent presentation to spring-mass system 400 for oscillation thereof.

Transducing means 410 combines the output of amplified compensation signals from gain blocks 370 and 375 to provide a mechanical modulation signal $\Delta\omega_d$ which is summed with the output of dither drive voltage control circuit 402 represented by $\omega_d$. Transducing means 410 includes a signal processing means combining the output signals of gain blocks 373 and 375 for providing a single output signal $\Delta\omega_d$ so as to provide a phase rate bias proportional to the sum of the amplified compensation output signals provided by gain blocks 370 and 375.

Figure 5:
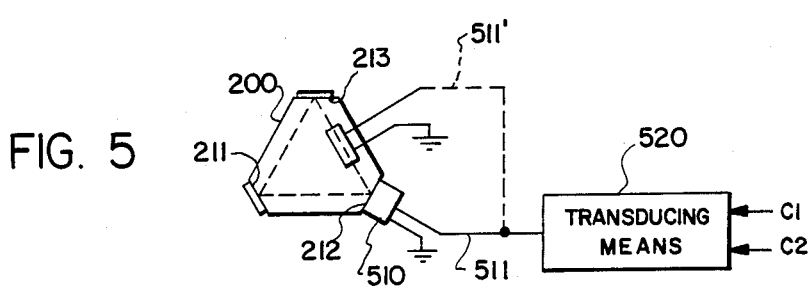
FIG. 5 is a block diagram showing another embodiment of the invention.

As so far indicated, a compensation phase rate bias signal may be provided by a variety of techniques. Any means which can alter the phase rate of the phase difference between the propagating waves of the sensor are within the scope of the present invention. Another example of introducing a phase rate bias signal is the use of a mirror transducing means which is utilized as one of the mirrors defining the closed-loop path. Shown in FIG. 5 is a simplified block diagram in which a mirror transducing means 510 providing a wave reflecting surface such as mirror 212 whose position can be altered in response to a control signal presented thereto. Similar to FIG. 4, a transducing means 520 is shown responsive to the output of gain blocks 370 and 375 for providing a mirror transducing means control signal 511 for controlling the position of mirror 212. In operation, transducing means 520 combines the output signals of gain blocks 370 and 375 for introducing a phase rate bias by altering the path length of the closed-loop path through varying the position of mirror 212.

Alternatively shown in FIG. 5 is a phase rate biasing means comprising a wave modulator 530 such as a Faraday cell or the like in the path of the waves. The modulator 530 is shown responsive to an alternative output 511' from transducing means 520. With this arrangement, a phase rate bias can be introduced by modulating the waves by wave modulator 530 directed by the output of transducing means 520. As before, the combination of signals $C_1$ and $C_2$ and transducing means 520 provide appropriate signals to the wave modulator for providing a phase rate bias which is equal in magnitude but opposite in sign, as the phase rate error due to lock-in.

In the embodiments thus far presented, the phase rate error due to lock-in was derived from the individual intensities of the counter-propagating waves such as provided by the output signals of photodetectors 310 and 320 of FIG. 3. It is, however, possible to provide a signal directly related to the phase rate error term of equation (1) from a signal related to the combined intensities of the counter-propagating waves as is usually provided in most sensors by heterodyning a portion of each of the counter-propagating waves to form an interference pattern.

Shown in FIG. 3, one of the corners of the triangular optical closed-loop path is provided with a corner-prism 390 which provides a wave reflecting surface such as 212 shown in FIG. 2. The prism 390 is arranged so as to heterodyne a portion of each of the counter-propagating waves to form an interference pattern which is projected so as to impinge on photodetector 395. The output of the photodetector 395 is commonly referred to as the double beam signal DBS which is indicative of the phase rate of the counter-propagating waves. The phase rate signal, i.e. double beam signal, contains phase modulation directly related to the phase rate error term of equation (1).

As shown in FIG. 3 the double beam signal, or phase rate signal may be processed by signal processing means 396 for providing a compensation output signal $C_3$ which is directly related to the phase rate error. The output of signal processing means 396 is presented to transducing means 397 which in turn can provide the modulation currents $\Delta i_1$ and $\Delta i_2$ or a single modulation current to provide a phase rate bias in a manner as already described in which the phase rate bias is substantially equal in magnitude, but opposite in sign, of the phase rate error. In a similar manner, the compensation output signal provided by signal processing means 396 may be utilized in the embodiments shown in FIGS. 4 and 5.

The embodiments shown in the present application all have been illustrated with a sensor having a closed-loop path in the form of a triangle. However, the invention of the present application is not limited in scope to such closed-loop paths since the principles of the invention are applicable to any type of closed-loop path which provides a path for counter-propagating waves. While embodiments of the invention have been shown using analog circuit components, it is well known to those skilled in the art that a digital implementation of the described embodiments herein may also be implemented. Furthermore, although the invention has been shown with a ring laser angular rate sensor, other waves are, of course possible and are within the intended scope of the present application.

Thus it will be appreciated that althrough specific embodiments of the invention have been shown and described herein, modifications may be made. It is intended that the following claims cover all the modifications which come with the true spirit and scope of the invention of the present application.

The embodiments of the invention in which an exclusive property or right is claimed are defined as follows:

1. A lock-in error correction apparatus for an angular rate sensor of the class wherein two waves propagate in opposite directions along a closed-loop path, each of said waves having an intensity associated therewith which includes intensity variations related to the coupling of energy of each of said waves into the other along said closed-loop path, wherein the frequency of each of said waves and corresponding phase rate related to the phase difference between said waves is a function of the rate of rotation of said closed-loop path, and wherein associated with said sensor is a phase rate error related to said coupling of energy, the apparatus comprising:

phase rate biasing means having output means coupled to said sensor for altering said phase rate to provide a phase rate bias in response to at least a first compensation signal; and phase rate error detection means having input means responsive to at least one of said waves for providing a first compensation signal related to, at least in part, said phase rate error so as to direct said phase rate biasing means to produce said phase rate bias so as to have magnitude and sign which is substantially equal in magnitude, but opposite in sign, of said phase rate error.

2. The apparatus of claim 1 wherein said phase rate error detection means includes means responsive to said intensity variations of at least one of said waves for providing said at least a first compensation output signal.

3. The apparatus of claim 2 wherein said phase rate error detection means includes means for providing a signal being a function of the first derivative of said at least one wave intensity, said at least a first compensation signal being a function of said first derivative.

4. The apparatus of claim 1 wherein said phase rate error detection means includes signal means responsive to each of said wave intensities for providing a first output signal being a function of the first derivative with respect to time of the intensity of one of said waves and for providing a second output signal being a function of the first derivative with respect to time of the intensity of the other one of said waves, and providing said at least a first compensation signal being a function of said first output signal and a second compensation output signal being a function of said second output signal.

5. The apparatus of claim 4 wherein:

said sensor includes first and second electrical currents for generating said waves; and said phase rate biasing means includes transducing means responsive to said first and second compensation signals for modulating said first and second electrical currents respectively and thereby produce said phase rate bias.

6. The apparatus of claim 4 wherein said signal means includes:

a first photodetection means coupled to said input means for providing an intensity signal related to the intensity of one of said waves; and a second photodetection means coupled to said input means for providing an intensity signal related to the intensity of the other one of said waves.

7. The apparatus of claim 1 wherein:

said phase rate biasing means further comprises means interposed in a signal path between said input means and said output means for providing phase adjustment and gain adjustment so that said phase rate bias is substantially equal in magnitude and in phase with said phase rate error but with opposite sign.

8. The apparatus of claim 1 wherein said phase rate error detection means input means is responsive to each of said waves and includes:

combining means for combining a portion of each of said waves for providing a phase rate signal indicative of said phase rate; and means responsive to said phase rate signal for providing said at least a first compensation signal.

9. The apparatus of claim 8 wherein said combining means includes:

means for heterodyning a portion of each of said waves for providing an interference pattern;

photodetection means responsive to said interference pattern for providing said phase rate signal.

10. The apparatus of claim 1 wherein said phase rate biasing means includes means interposed in the path of said waves responsive to said at least a first compensation signal for providing said phase rate bias.

11. The apparatus of claim 1 wherein:

said closed-loop path includes at least one wave reflecting means so as to define, at least in part, said closed-loop path; and said phase rate biasing means includes means for altering the position of said at least one wave reflecting means in response to said at least a first compensation signal so as to provide said phase rate bias.

12. The apparatus of claim 1 wherein said angular rate sensor includes:

means for rotationally oscillating said sensor in a rotational mode, back and forth; and said phase rate biasing means includes means for modulating said rotational oscillations in response to said at least a first compensation signal so as to provide said phase rate bias.

13. The apparatus of claims 4, 5, 8, 9, or 10 wherein said sensor includes a biasing means for introducing a frequency bias in at least one of said waves for preventing said waves from locking in to a common frequency for at least a majority of the time.

14. The apparatus of claim 13 wherein said biasing means includes means for oscillating said sensor in a rotational mode, back and forth for introducing said frequency bias.

15. The apparatus of claim 1 wherein said phase rate error detection means includes photodetection means coupled to said input means for providing an intensity signal related to the intensity of one of said waves.

16. The apparatus of claim 1 wherein said waves are in the form of laser beams.

17. The apparatus of claim 1 wherein said closed-loop path is in the shape of a triangle.

18. The apparatus of claim 3 wherein said phase rate error detecting means includes means for providing said at least one compensation signal having the form $\dot{I}_1/I_1$ where $\dot{I}_1$ is said first derivative of the intensity of one of said waves $I_1$.

19. The apparatus of claim 4 wherein said signal means further includes means for providing said at least a first compensation signal having the form of $\dot{I}_1/I_1$ and providing said second compensation signal having the form $\dot{I}_2/I_2$ where $\dot{I}_1$ and $\dot{I}_2$ are said first derivatives of wave intensities $I_1$ and $I_2$ respectively.

20. The apparatus of claims 10, 11, or 12 wherein:
said phase rate biasing means further comprises means interposed in a signal path between said input means and said output means for providing phase adjustment and gain adjustment so that said phase rate bias is substantially equal in magnitude and in phase with said phase rate error but with opposite sign.

21. The apparatus of claim 20 wherein said phase rate error detection means includes means responsive to said intensity variations of at least one of said waves for providing said at least a first compensation output signal.

22. The apparatus of claim 20 wherein said phase rate error detection means input means is responsive to each of said waves and includes:
combining means for combining a portion of each of said waves for providing a phase rate signal indicative of said phase rate; and
signal processing means responsive to said phase rate signal for providing said at least a first compensation signal.

* * * * *